United States Patent
Enomoto

(10) Patent No.: US 9,156,370 B1
(45) Date of Patent: Oct. 13, 2015

(54) OFFBOARD POWER SUPPLY SYSTEM HAVING EMISSION LEVEL EVALUATION FOR AN ELECTRIC VEHICLE

(71) Applicant: Tomoyuki Enomoto, Torrancce, CA (US)

(72) Inventor: Tomoyuki Enomoto, Torrancce, CA (US)

(73) Assignee: HONDA MOTOR CO. LTD., Tokyo (JP)

(*) Notice: Subject to any disclaimer, the term of this patent is extended or adjusted under 35 U.S.C. 154(b) by 37 days.

(21) Appl. No.: 14/278,723

(22) Filed: May 15, 2014

(51) Int. Cl.
- B60L 11/00 (2006.01)
- B60L 11/18 (2006.01)
- B60W 20/00 (2006.01)
- B60W 10/06 (2006.01)
- B60W 10/26 (2006.01)

(52) U.S. Cl.
CPC ......... B60L 11/1861 (2013.01); B60L 11/1842 (2013.01); B60W 10/06 (2013.01); B60W 10/26 (2013.01); B60W 20/1082 (2013.01); Y02T 90/14 (2013.01); Y10S 903/93 (2013.01)

(58) Field of Classification Search
CPC ........... B60L 11/1861; B60L 11/1842; B60W 20/1082; B60W 10/26; B60W 10/06; Y10S 903/93; Y10S 20/108; Y10S 20/1082; Y02T 10/7044; Y02T 90/14; H02J 7/0057
See application file for complete search history.

(56) References Cited

U.S. PATENT DOCUMENTS

| | | | |
|---|---|---|---|
| 7,167,791 B2 | 1/2007 | Kappauf et al. | |
| 7,482,704 B2 | 1/2009 | Priem | |
| 8,249,795 B2 | 8/2012 | Surnilla et al. | |
| 8,365,620 B2 | 2/2013 | Haka | |
| 8,375,913 B2 | 2/2013 | Kwiecinski et al. | |
| 8,627,306 B2 | 1/2014 | Meiss et al. | |
| 2002/0096886 A1* | 7/2002 | Schmitz et al. | 290/40 C |
| 2003/0172643 A1* | 9/2003 | Suzuki | 60/284 |
| 2004/0074682 A1* | 4/2004 | Fussey et al. | 180/65.2 |
| 2004/0099234 A1* | 5/2004 | Tamai et al. | 123/179.3 |
| 2004/0104058 A1* | 6/2004 | Peters et al. | 180/65.2 |
| 2011/0166733 A1 | 7/2011 | Yu et al. | |
| 2014/0002021 A1* | 1/2014 | Bertness, Kevin I. | 320/109 |
| 2014/0060045 A1* | 3/2014 | Loveland et al. | 60/624 |
| 2014/0180513 A1* | 6/2014 | Kozloski et al. | 701/22 |
| 2015/0048802 A1* | 2/2015 | Tani et al. | 320/149 |
| 2015/0066262 A1* | 3/2015 | Chang et al. | 701/22 |

* cited by examiner

Primary Examiner — Rodney Butler
(74) Attorney, Agent, or Firm — Weiss & Moy, P.C.

(57) ABSTRACT

An offboard power supply for a PHEV has an electric motor. A battery pack is coupled to the electric motor. An internal combustion engine (ICE) is coupled to the battery pack. An offboard power supply control module is coupled to the battery pack to direct power stored in the battery pack to an offboard electric power-consuming device coupled to the offboard power supply control module. A sensor module monitors emissions levels around the PHEV and allows for charging of the battery pack by the ICE when the emission levels around the PHEV are at or below a predetermined value.

20 Claims, 2 Drawing Sheets

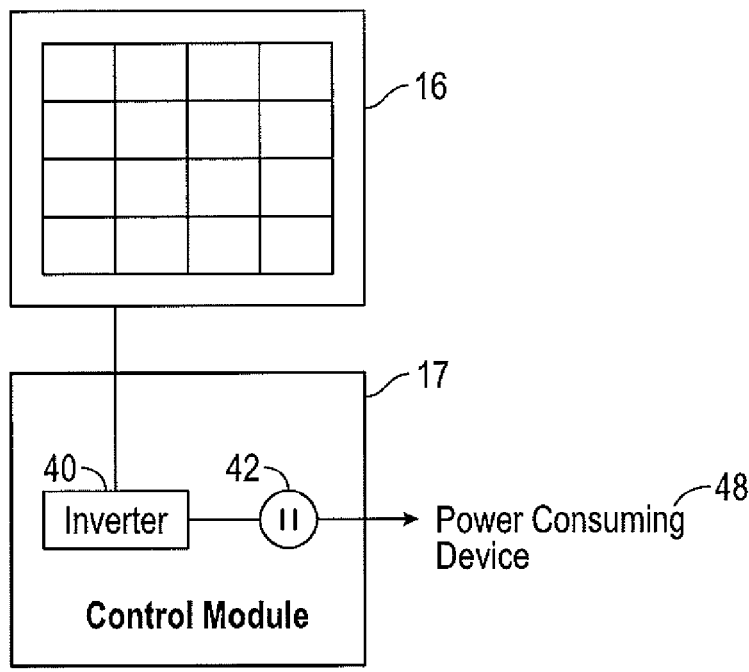
FIG. 3
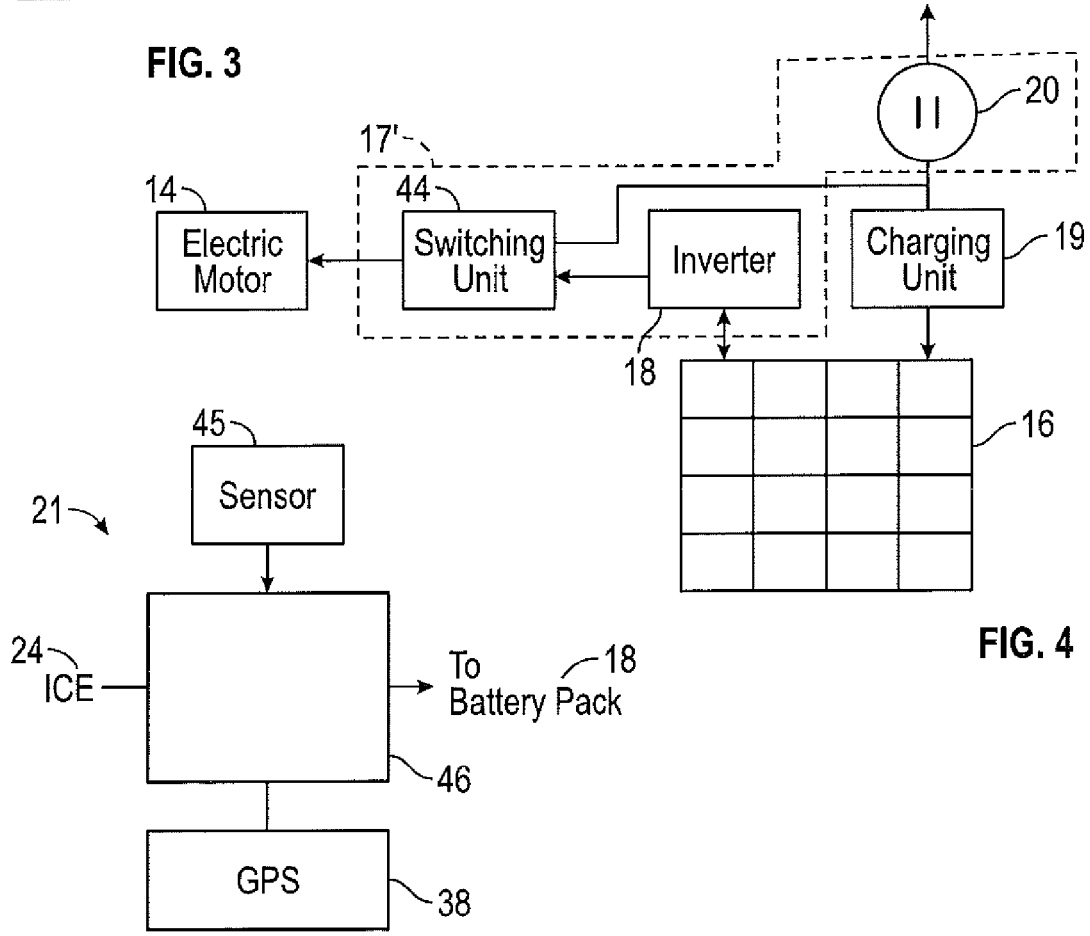
FIG. 4
FIG. 5

OFFBOARD POWER SUPPLY SYSTEM HAVING EMISSION LEVEL EVALUATION FOR AN ELECTRIC VEHICLE

TECHNICAL FIELD

The present application generally relates to an electric vehicle, and, more particularly, to a Plug-in Hybrid Electric Vehicle (PHEV) having a system to provide power to offboard electric power-consuming systems or devices and which would recharge the system providing offboard electric power if emission levels in the vicinity of the PHEV are at an acceptable predetermined level.

BACKGROUND

A plug-in hybrid electric vehicle (PHEV) is a hybrid vehicle which may have an electric motor and an internal combustion engine (ICE). The PHEV may use rechargeable batteries, or another energy storage device (hereinafter rechargeable batteries), that can be restored to full charge by connecting the rechargeable batteries via a plug to an external electric power source such as an electric wall socket. The rechargeable batteries may also be recharged through operation of the ICE.

PHEVs may operated primarily by electric propulsion. The ICE may be used to assist vehicle propulsion in limited circumstances such as high speed and/or high power demand operations due to system constraints. The ICE may further be used after the usable power stored in the rechargeable batteries has depleted. By relying on electrical energy from the grid to charge the battery and then using that energy for a significant fraction of vehicle travel, the amount of fuel consumed by the PHEV is greatly reduced, especially when the traveling distance is close to the primary PHEV range.

When the PHEV is not in use, the rechargeable batteries may store a significant amount of electrical energy. The stored electrical energy generally goes unused unless the electric motor in the PHEV is used to propel the PHEV. The electrical energy stored in the rechargeable batteries may be used to power electric power-consuming systems and or devices when the PHEV is not in use. Unfortunately, presently PHEVs do not allow for this functionality.

Therefore, it would be desirable to provide a system and method that overcome the above problems.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, an offboard power supply for a PHEV has an electric motor. A battery pack is coupled to the electric motor. An internal combustion engine (ICE) is coupled to the battery pack. An offboard power supply control module is coupled to the battery pack to direct power stored in the battery pack to an offboard electric power-consuming device coupled to the offboard power supply control module. A sensor module monitors emissions levels around the PHEV and allows charging of the battery pack by the ICE when the emission levels around the PHEV are at or below a predetermined value.

In accordance with another aspect of the present application, a system for providing offboard power from a PHEV has an electric motor and an internal combustion engine (ICE). A battery pack is coupled to the electric motor. A converter is coupled to the ICE and the battery pack to convert power from the ICE to DC power to charge the battery pack. An offboard power supply control module is coupled to the battery pack to direct power stored in the battery pack to an offboard electric power-consuming device coupled to the offboard power supply control module. A sensor module monitors emissions levels around the PHEV and allows for charging of the battery pack by the ICE when the emission levels around the PHEV are at or below a predetermined value.

In accordance with another aspect of the present application, an offboard power supply for a PHEV has an electric motor and an internal combustion engine (ICE). A battery pack is coupled to the electric motor. A converter is coupled to the ICE and the battery pack to convert power from the ICE to DC power to charge the battery pack. An offboard power supply control module is coupled to the battery pack to direct power stored in the battery pack to an onboard electric power-consuming device coupled to the offboard power supply control module. A sensor module monitors emissions levels around the PHEV and allows for charging of the battery pack by the ICE when the emission levels around the PHEV are at or below a predetermined value. A Global Positioning System (GPS) unit is coupled to the sensor module to indicate a present position of the PHEV. The sensor module allows for charging of the battery pack by the ICE when emission levels monitored by the sensor module are at or below a predetermined value and the GPS indicate the PHEV is located in an open air space.

BRIEF DESCRIPTION OF DRAWINGS

Embodiments of the disclosure will become more fully understood from the detailed description and the accompanying drawings, wherein:

FIG. 3 is a simplified functional block diagram of an offboard power supply module of the exemplary system depicted in FIG. 1 in accordance with one aspect of the present application; and FIG. 4 is a simplified functional block diagram of an offboard power supply module of the exemplary system depicted in FIG. 1 in accordance with another aspect of the present application; and FIG. 5 is a simplified functional block diagram of a sensor module the exemplary system depicted in FIG. 1 in accordance with another aspect of the present application.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
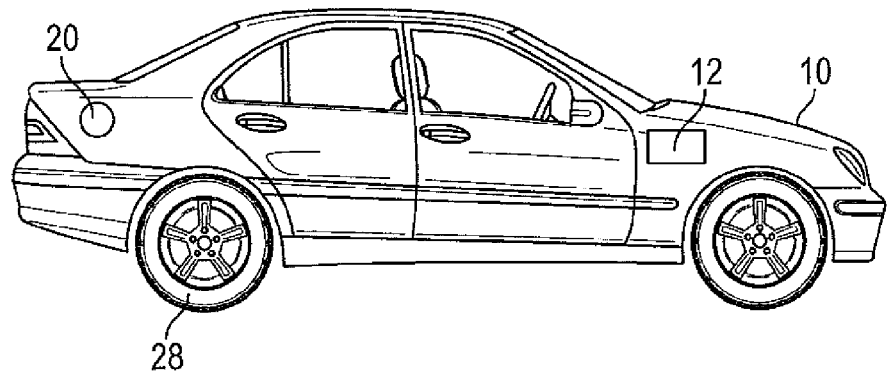
FIG. 1 is an elevated perspective view of a vehicle implementing an exemplary system for providing offboard power and having an emission level detection in accordance with one aspect of the present application.

Referring to FIG. 1, an exemplary Plug-in Hybrid Electric Vehicle (PHEV) 10 is shown. The PHEV 10 may be equipped with a system 12. The system 12 may allow for the PHEV 10 to provide offboard power to electric power-consuming systems and or devices. The system 12 may have an emission level detection feature that may be used to control charging of the PHEV 10. The emission level detection feature of system 12 may allow for charging of the PHEV 10 when emission levels in a vicinity of the PHEV 10 are at or below a predetermined value as will be described below.

Figure 2:
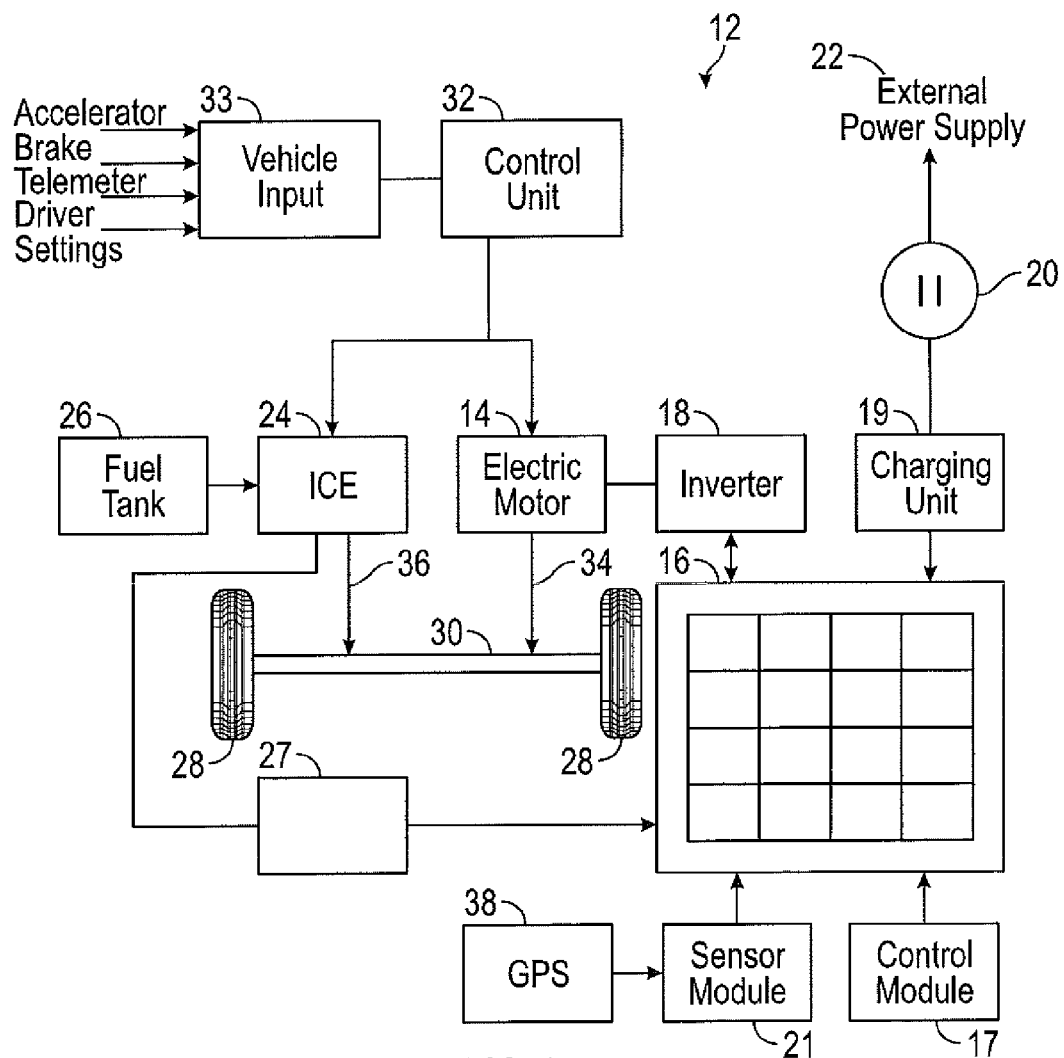
FIG. 2 is a simplified functional block diagram of the vehicle implementing the exemplary system depicted in FIG. 1 in accordance with one aspect of the present application.

Referring now to FIGS. 1 and 2, the system 12 in the PHEV 10 may be seen. The system 12 may have an electric motor 14. The electric motor 14 may be used for propelling the PHEV 10. The electric motor 14 may be used as the main source of propulsion by the PHEV 10.

The system 12 may have a battery pack 16. The battery pack 16 may be used to power the electric motor 14. The battery pack 16 may be coupled to the electric motor 14 through an inverter 18. The inverter 18 may be used to convert DC current from the battery pack 16 to an AC current for powering the electric motor 14.

The system 12 may have a charging device 19. The battery back 16 may be coupled to a charging device 19. The charging device 19 may be used to recharge the battery pack 16 when the charging device 19 is connected to an external power supply 22 such as an electric power grid or the like. The charging device 19 may be used to convert the AC power from the external power supply 22 to DC power for charging the battery back 16. A connector 20 may be couple to the changing device 19. The connector 20 may be used to couple the external power supply 22 to the charging device 19.

The system 12 may have an internal combustion engine (ICE) 24. The ICE 24 may be used to assist propulsion of the PHEV 10. The ICE 24 may be used in circumstances such as high speed and/or high power demand operations due to system constraints. The ICE 24 may be used to power the PHEV 10 when the battery pack 16 has no power to power the electric motor 14. The above listing is given as an example and should not be seen in a limiting manner. The ICE 24 may be coupled to a fuel source 26. The fuel source 26 may be used for powering the ICE 24.

The ICE 24 may be used to recharge the battery pack 16. When the ICE 24 is running, power from the ICE 24 may be used to recharge the battery pack 16. A converter 27 or similar device may be positioned between the ICE 24 and the battery pack 16. The converter 27 may be used to convert the energy from the ICE 24 to DC power for charging the battery back 16.

The electric motor 14 and the ICE 26 may be coupled to drive wheels 28 of the PHEV 10 through a drive train 30. The drive train 30 may be used to deliver power generated by the electric motor 14 and or the ICE 16 to rotate the drive wheels 28.

The electric motor 14 and the ICE 26 may be coupled to a control unit 32. The control unit 32 may be coupled to a plurality of vehicle inputs 33. The vehicle inputs 33 may include, but is not limited to, accelerator pedal, brake pedal, vehicle telemeters, driver settings, and the like. Based on the vehicle inputs 33, the control unit 32 may send command signals 34, 36 to the electric motor 14 and the ICE 26, respectively. The command signals 34, 36 may be used to indicate whether the electric motor 14 and or the ICE 26 may be used to propel the PHEV 10. The control unit 32 may be programmed to optimize performance of the PHEV 10. For example, the control unit 32 may be programmed to determine when the ICE 26 is used to assist in propulsion of the PHEV 10.

The system 12 may have a Global Positioning Satellite (GPS) unit 38. The GPS unit 38 may be used to determine a present location of the PHEV 10. The GPS unit 38 may be able to provide speed and direction of travel data of the PHEV 10. The GPS unit 38 may be configured to calculate and recalculate a route from a present location of the PHEV 10 to a desired destination based on current road conditions.

The system 12 may have an offboard power supply control module 17. The offboard power supply control module 17 may be used to direct power stored in the battery pack 16 to an electric power-consuming systems and or devices. The system 12 may have a sensor module 21. The sensor module 21 may be used to monitor an emission level around the PHEV 10. The sensor module 21 may allow for charging of the PHEV 10 when emission levels in a vicinity of the PHEV 10 are at or below a predetermined value as described below.

Referring now to FIG. 3, one embodiment of the offboard power supply control module 17 is shown. The offboard power supply control module 17 may have an inverter 40. The inverter 40 may be coupled to the battery pack 16. The inverter 40 may be used to convert DC current from the battery pack 16 to an AC current for powering an offboard power consuming system/device 48. A connector 42 may be coupled to the inverter 40. The connector 42 may be used to allow the offboard power consuming system/device 48 to be coupled to the battery pack 16 so that energy stored in the battery pack 16 may be used to power the offboard power consuming system/device 48.

The system 12 may use the offboard power supply control module 17 to direct power from the battery pack 16 to the offboard power consuming system/device 48 that may be coupled to the connector 42. In general, the system 12 may be used to power the offboard power consuming system/device 48 when power from an electrical grid system may not be readily available. For example, the system 12 may be used as a generator to provide power for a home when electricity to the home has been disconnected due to weather or other disturbances. The system 12 may be used to provide power to sump pumps or the like during situations where power is not readily available and water may need to be removed from a building. The system 12 may be used to supply power to a wireless router or the like to provide a WiFi hotspot to allow garners to play video games where a connection is not good. In this manner, the PHEV 10 may be able to supply energy to a wireless router or the like to increase the processing power of the hotspot, instead of using a smartphone as the hotspot. The above are given as examples and should not be seen in a limiting manner.

Referring now to FIG. 4, another embodiment of the offboard power supply control module 17' is shown. In the present embodiment, the offboard power supply control module 17' may have a switching unit 44. The switching unit 44 may be used to send power from the inverter 18 away from the electric motor 14 and to the connector 20. The switching unit 44 may disconnect the connector 20 from the charging device 19 so that power will flow through the connector 20 to the offboard power consuming system/device connected to the connector 20 and not back through the charging device 19 to the battery pack 16. Thus, the switching unit 44 may be used to direct power from the battery pack 16 to the connector 20 via the inverter 18.

The system 12 may use the offboard power supply control module 17' to direct power from the battery pack 16 to the offboard power consuming system/device that may be coupled to the connector 20. In general, the system 12 may be used to power the offboard power consuming system/device 48 when power from an electrical grid system may not be readily available. For example, the system 12 may be used as a generator to provide power for a home when electricity to the home has been disconnected due to weather or other disturbances. The system 12 may be used to provide power to sump pumps or the like during situations where power is not readily available and water may need to be removed from a building. The system 12 may be used to supply power to a wireless router or the like to provide a WiFi hotspot to allow gainers to play video games where a connection is not good. In this manner, the PHEV 10 may be able to supply energy to a wireless router or the like to increase the processing power of the hotspot, instead of using a smartphone as the hotspot. The above are given as examples and should not be seen in a limiting manner.

Referring to FIG. 5, the system 12 may a sensor module 21. The sensor module 21 may be used to monitor an emission level around the PHEV 10. For example, the sensor module 21 may be used to monitor carbon monoxide (CO) levels, carbon dioxide ($CO_2$) levels, mono-nitrogen oxides (NO and $NO_2$) levels, ozone levels, particulates in the air, and the like. The above listing is given as an example and should not be seen in a limiting manner. The sensor module 21 may allow for charging of the PHEV 10 when emission levels monitored by the sensor module 21 in a vicinity of the PHEV 10 are at or below a predetermined value as described below. More specifically, the sensor module 21 may be used to allow for charging of the battery pack 16 by the ICE 24 when the emission levels monitored by the sensor module 21 in the vicinity of the PHEV 10 are at or below a predetermined value. The sensor module 21 may allow charging of the battery pack 16 by an external power supply 22 plugged into the battery pack 16 even if the emission levels monitored by the sensor module 21 in a vicinity of the PHEV 10 are above the predetermined value.

The sensor module 21 may have one or more sensors 45. The sensors 45 may be positioned around a perimeter of the PHEV 10. The sensors 45 may be positioned towards an upper area of a body of the PHEV 10. For example, the sensors 45 may be positioned near the roof of the PHEV 10. The above is given as an example, and should not be seen in a limiting manner. The sensors 45 may be positioned at other areas of the PHEV 10 without departing from the spirit and scope.

The sensor module 21 may further have a control unit 46. The control unit 46 may be used to monitor readings from the one or more sensors 45. If the readings that are monitored exceed a predetermined value, the control unit 46 may prevent energy generated by the ICE 26 from being used to charge the battery pack 16. If the readings that are monitored by the control unit 46 are below the predetermined value, the control unit 46 may allow charging of the battery pack 16 by the ICE 26.

The sensor module 21 may be coupled to the GPS unit 38. The sensor module 21 may check the location of the PHEV 10 using GPS unit 38. If the PHEV 10 is identified as being in a closed environment such as a garage or a garage like structure, then sensor module 21 may prevent the charging of the battery pack 16 by the ICE 24. However, if the PHEV 10 is identified as being in an open space such as a camping ground, open parking lot, or the like, then the charging of the battery pack 16 by the ICE 24 may be allowed. The GPS unit 38 may work in combination with the sensor 44 or alone. Thus, if the PHEV 10 is identified as being in a garage or in a garage structure, then the charging of the battery pack 16 by the ICE 24 may not take place even if the sensor 44 detects emission levels below the predetermined value. Similarly, if the PHEV 10 is identified as being in an open space such as a camping ground, an open air parking lot or the like, then the charging of the battery pack 16 by the ICE 24 may take place even if the sensor 44 detects emission levels above the predetermined value.

In operation, the system 12 may allow individuals to couple an offboard power consuming system/device 48 to the connector 20 and/or 42. If the connector 20 is used, a switching unit 44 may need to be used to send power from the inverter 18 away from the electric motor 14 and to the connector 20. Power form the battery pack 16 may then be used to power the offboard power consuming system/device 48 coupled to the connector 20 and/or 42. The ICE 24 may be used to charge of the battery pack 16. The sensor module 21 may allow the ICE 24 to charge of the battery pack 16 when emission levels in a vicinity of the PHEV 10 are at or below a predetermined value. However, the battery pack 16 may be charged by an external power supply 22 plugged into the battery pack 16 even if the emission levels in a vicinity of the PHEV 10 are above the predetermined value.

If the PHEV 10 is running, the system 12 may be configured to have the ICE 24 automatically recharge the battery pack 16 if emission levels in the area are the below predetermined value. Alternatively, the system 12 may be configured to have the ICE 24 recharge the battery pack 16 when the power level in the battery pack 16 falls below a predetermined value.

If the PHEV 10 is not running, the system 12 may be configured to have the ICE 24 automatically activated and recharge the battery pack 16 if emission levels in the area are below the predetermined value and the power level in the battery pack 16 falls below a predetermined value. Alternatively, when the power level in the battery pack 16 falls below a predetermined value, the system 12 may send a warning indicating that the battery pack 16 should be recharged. The user may then either plug the PHEV 10 into an external power supply 22 or the user may change the driver settings in the vehicle input 33 so that the ICE 24 may be used to recharge the battery pack 16 if emission levels in the area are below the predetermined value.

While embodiments of the disclosure have been described in terms of various specific embodiments, those skilled in the art will recognize that the embodiments of the disclosure may be practiced with modifications within the spirit and scope of the claims.

What is claimed is:

1. An offboard power supply for a PHEV comprising:
   an electric motor;
   an internal combustion engine (ICE);
   a battery pack coupled to the electric motor;
   a converter coupled to the ICE and the battery pack to convert power from the ICE to DC power to charge the battery pack;
   an offboard power supply control module coupled to the battery pack to direct power stored in the battery pack to an offboard electric power-consuming device coupled to the offboard power supply control module;
   a sensor module monitoring emissions levels around the PHEV and allowing for charging of the battery pack by the ICE when the emission levels around the PHEV are at or below a predetermined value;
   a Global Positioning System (GPS) unit coupled to the sensor module to indicate a present position of the PHEV, wherein the sensor module allows for charging of the battery pack by the ICE when emission levels monitored by the sensor module are at or below a predetermined value and the GPS indicate the PHEV is located in an open air space.

2. The offboard power supply of claim 1, wherein the sensor module allows for charging of the battery pack by an external power supply regardless of emission levels detected.

3. The offboard power supply of claim 1, wherein the offboard power supply control module comprises:
   an inverter coupled to the battery pack;
   a connector coupled to the inverter for attaching the offboard electric power consuming device to the battery pack.

4. The offboard power supply of claim 1, wherein the offboard power supply control module comprises:
   an inverter coupled to the battery pack;
   a connector coupled to the inverter for attaching the offboard electric power consuming device to the battery pack; and
   a switching device, the switching device disconnects the inverter from the electric motor and disconnects the connector from a charging unit of the PHEV.

5. The offboard power supply of claim 1, wherein the sensor module comprises:
   at least one sensor to monitor emissions levels around the PHEV; and
   a control unit coupled to the at least one sensor and to the ICE, the control unit monitoring readings from the at least one sensor and preventing charging of the battery pack by the ICE when the readings monitored exceed a predetermined value.

6. The offboard power supply of claim 1, wherein the sensor module monitors at least one of carbon monoxide (CO) levels, carbon dioxide ($CO_2$) levels, mono-nitrogen oxides (NO and $NO_2$) levels, ozone levels, particulates in the air, and combinations thereof.

7. A system for providing offboard power from a PHEV comprising:
   an electric motor;
   an internal combustion engine (ICE);
   a battery pack coupled to the electric motor;
   a converter coupled to the ICE and the battery pack to convert power from the ICE to DC power to charge the battery pack;
   an offboard power supply control module coupled to the battery pack to direct power stored in the battery pack to an offboard electric power-consuming device coupled to the offboard power supply control module; and
   a sensor module monitoring emissions levels around the PHEV and allowing for charging of the battery pack by the ICE when the emission levels around the PHEV are at or below a predetermined value.

8. The system of claim 7, wherein the offboard power supply control module comprises:
   an inverter coupled to the battery pack;
   a connector coupled to the inverter for attaching the offboard electric power consuming device to the battery pack.

9. The system of claim 7, wherein the offboard power supply control module comprises:
   an inverter coupled to the battery pack and the electric motor;
   a connector coupled to the inverter for attaching the offboard electric power consuming device to the battery pack; and
   a switching device, the switching device disconnects the inverter from the electric motor and disconnects the connector from a charging unit of the PHEV.

10. The system of claim 7, wherein the sensor module comprises:
    at least one sensor to monitor emissions levels around the PHEV; and
    a control unit coupled to the at least one sensor and to the ICE, the control unit monitoring readings from the at least one sensor and preventing charging of the battery pack by the ICE when the readings monitored exceed a predetermined value.

11. The system of claim 10, further comprising a Global Positioning System (GPS) unit coupled to the sensor module to indicate a present position of the PHEV.

12. The system of claim 11, wherein the sensor module allows for charging of the battery pack by the ICE when emission levels monitored by the at least one sensor are at or below a predetermined value and the GPS indicate the PHEV is located in an open air space.

13. The system of claim 12, wherein the sensor module allows for charging of the battery pack by an external power supply regardless of emission levels detected.

14. An offboard power supply for a PHEV comprising:
    an electric motor;
    a battery pack coupled to the electric motor;
    an internal combustion engine (ICE) coupled to the battery pack;
    an offboard power supply control module coupled to the battery pack to direct power stored in the battery pack to an offboard electric power-consuming device coupled to the offboard power supply control module; and
    a sensor module monitoring emissions levels around the PHEV and allowing for charging of the battery pack by the ICE when the emission levels around the PHEV are at or below a predetermined value.

15. The offboard power supply of claim 14, further comprising a Global Positioning System (GPS) unit coupled to the sensor module to indicate a present position of the PHEV.

16. The offboard power supply of claim 14, wherein the offboard power supply control module comprises:
    an inverter coupled to the battery pack;
    a connector coupled to the inverter for attaching the offboard electric power consuming device to the battery pack.

17. The offboard power supply of claim 14, wherein the offboard power supply control module comprises:
    an inverter coupled to the battery pack;
    a connector coupled to the inverter for attaching the offboard electric power consuming device to the battery pack; and
    a switching device, the switching device disconnects the inverter from the electric motor and disconnects the connector from a charging unit of the PHEV.

18. The offboard power supply of claim 14, wherein the sensor module comprises:
    at least one sensor to monitor emissions levels around the PHEV; and
    a control unit coupled to the at least one sensor and to the ICE, the control unit monitoring readings from the at least one sensor and preventing charging of the battery pack by the ICE when the readings monitored exceed a predetermined value.

19. The offboard power supply of claim 15, wherein the sensor module allows for charging of the battery pack by the ICE when emission levels monitored by the sensor module are at or below a predetermined value and the GPS indicate the PHEV is located in an open air space.

20. The offboard power supply of claim 19, wherein the sensor module allows for charging of the battery pack by an external power supply regardless of emission levels detected.

* * * * *

UNITED STATES PATENT AND TRADEMARK OFFICE
CERTIFICATE OF CORRECTION

| | | |
|---|---|---|
| PATENT NO. | : 9,156,370 B1 | |
| APPLICATION NO. | : 14/278723 | |
| DATED | : October 13, 2015 | |
| INVENTOR(S) | : Tomoyuki Enomoto | |

It is certified that error appears in the above-identified patent and that said Letters Patent is hereby corrected as shown below:

On the Title Page, Items (71) and (72) should read as:

(71) Applicant: line 1, replace "Torrancce" with "Torrance"

(72) Inventor: line 1, replace "Torrancce" with "Torrance"

Signed and Sealed this
Fifteenth Day of March, 2016

Michelle K. Lee
*Director of the United States Patent and Trademark Office*